United States Patent
Shen et al.

(10) Patent No.: US 11,283,061 B2
(45) Date of Patent: Mar. 22, 2022

(54) NEGATIVE ELECTRODE PLATE, TESTING METHOD OF ACTIVE SPECIFIC SURFACE AREA OF ELECTRODE PLATE, BATTERY

(71) Applicant: CONTEMPORARY AMPEREX TECHNOLOGY CO., LIMITED, Ningde (CN)

(72) Inventors: Yuliang Shen, Ningde (CN); Meng Kang, Ningde (CN); Jiazheng Wang, Ningde (CN); Libing He, Ningde (CN); Qiqi Zuo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 334 days.

(21) Appl. No.: 16/422,247

(22) Filed: May 24, 2019

(65) Prior Publication Data

US 2019/0363344 A1    Nov. 28, 2019

(30) Foreign Application Priority Data

May 24, 2018   (CN) .......................... 201810509992.9

(51) Int. Cl.
| | |
|---|---|
| *H01M 4/133* | (2010.01) |
| *H01M 4/38* | (2006.01) |
| *H01M 4/485* | (2010.01) |
| *H01M 4/62* | (2006.01) |
| *H01M 4/583* | (2010.01) |
| *H01M 4/66* | (2006.01) |
| *H01M 10/0525* | (2010.01) |
| *H01M 10/054* | (2010.01) |
| *H01M 4/02* | (2006.01) |

(52) U.S. Cl.
CPC .......... *H01M 4/133* (2013.01); *H01M 4/386* (2013.01); *H01M 4/387* (2013.01); *H01M 4/485* (2013.01); *H01M 4/583* (2013.01); *H01M 4/625* (2013.01); *H01M 4/667* (2013.01); *H01M 10/054* (2013.01); *H01M 10/0525* (2013.01); *H01M 2004/021* (2013.01); *H01M 2004/027* (2013.01)

(58) Field of Classification Search
CPC .......... H01M 2004/021; H01M 4/625; H01M 2004/027; H01M 4/0404
See application file for complete search history.

(56) References Cited

U.S. PATENT DOCUMENTS

| | | | | |
|---|---|---|---|---|
| 2008/0102196 A1* | 5/2008 | Morishima | ........... | H01M 4/131 427/74 |
| 2011/0143210 A1* | 6/2011 | Shimamura | ............. | H01M 4/62 429/300 |
| 2015/0207147 A1* | 7/2015 | Nagai | ................. | H01M 10/058 429/231.95 |
| 2015/0255795 A1* | 9/2015 | Sano | .................... | H01M 4/5825 429/163 |
| 2015/0270541 A1* | 9/2015 | Ise | .......................... | C30B 29/32 429/221 |
| 2017/0077547 A1* | 3/2017 | Takami | .................... | H01M 4/48 |
| 2017/0170472 A1* | 6/2017 | Mattis | ................... | H01M 4/386 |
| 2017/0187064 A1* | 6/2017 | Takeda | .............. | H01M 10/0525 |
| 2018/0287146 A1* | 10/2018 | Suzuki | .................. | H01M 4/366 |
| 2018/0301744 A1* | 10/2018 | Fukumine | ............. | H01M 4/622 |
| 2019/0157681 A1* | 5/2019 | Ho | ........................ | H01M 4/621 |
| 2019/0229338 A1* | 7/2019 | Ho | ...................... | H01M 4/1393 |

FOREIGN PATENT DOCUMENTS

| | | |
|---|---|---|
| CN | 1032549046 A | 8/2013 |
| EP | 3113254 A1 | 1/2017 |
| EP | 3168909 A1 | 5/2017 |
| JP | 2016095897 A | 5/2016 |

OTHER PUBLICATIONS

Contemporary Amperex Technology Co., Limited, First Office Action, CN201810509992.9, dated Dec. 29, 2018, 9 pgs.
Chi Yongqing et al., "Research Progress in Anode Materials for Power Li-ion Batteries," China Academic Journal Electronic Publishing House, Nov. 26, 2012, 6 pgs.
Ma Xuli et al., Electrodeposition of Nickel Hexacyanoferrate for the Estimation of the Electroactive Area in Porous Three-Dimensional Film Electrode, Rare Metal Materials and Engineering, vol. 42, No. 4, Apr. 2013, 5 pgs.
Flox Cristina et al: "Strategies for enhancing electrochemical activity of carbon-based electrodes forall-vanadium redox flow batteries", Applied Energy, Elsevier Science Publishers, GB, vol. 109, Mar. 5, 2013 (Mar. 5, 2013), pp. 344-351, XP028569732, ISSN: 0306-2619, DOI: 10.1 016/J.APENERGY.2013.02.001.
Contemporary Amperex Technology Co., Limited, The Extended European Search Report, EP19174551.2, dated Jul. 22, 2019, 8 pgs.

* cited by examiner

*Primary Examiner* — Imran Akram
(74) *Attorney, Agent, or Firm* — Morgan, Lewis & Bockius LLP

(57) ABSTRACT

The present disclosure provides a battery and a testing method of an active specific surface area of an electrode plate. The battery comprises a positive electrode plate, a negative electrode plate, a separator and an electrolyte, the negative electrode plate comprises a negative current collector and a negative film, the negative film is provided on at least one surface of the negative current collector and comprises a negative active material, the negative active material comprises graphite, and an active specific surface area of the negative electrode plate is 1 $cm^2/g$~15 $cm^2/g$. In the present disclosure, by reasonably controlling the active specific surface area of the negative electrode plate can make the battery have the characteristics of high energy density and excellent dynamics performance at the same time.

13 Claims, No Drawings

NEGATIVE ELECTRODE PLATE, TESTING METHOD OF ACTIVE SPECIFIC SURFACE AREA OF ELECTRODE PLATE, BATTERY

CROSS-REFERENCE TO RELATED APPLICATIONS

The present application claims priority to Chinese patent application No. CN201810509992.9, filed on May 24, 2018, which is incorporated herein by reference in its entirety.

FIELD OF THE PRESENT DISCLOSURE

The present disclosure relates to the field of battery, and particularly relates to a battery and a testing method of an active specific surface area of an electrode plate.

BACKGROUND OF THE PRESENT DISCLOSURE

Power batteries represented by lithium-ion batteries are widely used in new energy automotives at present due to significant characteristics of light weight, high energy density, no pollution, none memory effect, long service life and the like. However, a longer charging time is one of key factors limiting the rapid popularizion of the new energy automotives. From the viewpoint of technical principle, a core of the fast charging technology of the battery is how to improve the transferring speed of the lithium ions between the positive electrode plate and the negative electrode plate by harmonizing the chemical system and optimizing the design of the chemical system. If the negative electrode plate cannot bear a high current charging, the lithium metal will be precipitated on the negative electrode plate when the battery is charged under a large charging rate, and a large amount of side-products are also generated on the surface of the negative electrode plate, which affects the cycle life and the safety performance of the battery. Therefore, the key of the fast charging technology of the battery lies in the design of the negative active material and the design of the negative electrode plate.

At present, the negative active material used in the fast-charging battery in the industry mainly comprises lithium titanate and amorphous carbon, although the rate performance thereof is better, the energy density of the battery using the aforementioned two negative active materials is lower, which is unable to meet present use demands on the endurance mileage of the battery.

Therefore, how to obtain a fast charging capability without compromising the energy density is key in the design of the battery.

SUMMARY OF THE PRESENT DISCLOSURE

In view of the problem existing in the background, an object of the present disclosure is to provide a battery and a testing method of an active specific surface area of an electrode plate, the battery can have the characteristics of high energy density and excellent dynamics performance at the same time.

The present disclosure provides a battery which comprises a positive electrode plate, a negative electrode plate, a separator and an electrolyte, the negative electrode plate comprises a negative current collector and a negative film, the negative film is provided on at least one surface of the negative current collector and comprises a negative active material, the negative active material comprises graphite, and an active specific surface area of the negative electrode plate is 1 $cm^2/g$~15 $cm^2/g$.

Preferably, the active specific surface area of the negative electrode plate is 5.4 $cm^2/g$~15 $cm^2/g$. Further preferably, the active specific surface area of the negative electrode plate is 9.8 $cm^2/g$~12.5 $cm^2/g$.

The negative electrode plate further satisfies a relationship: $0.6 \leq CW/D50 \leq 1.3$, CW represents a coating weight per unit area on one of the surfaces of the negative electrode plate with a unit of $mg/cm^2$, D50 represents an average particle diameter of the negative active material with a unit of μm. Preferably, the negative electrode plate further satisfies a relationship: $0.6 \leq CW/D50 \leq 0.8$.

The coating weight per unit area on one of the surfaces of the negative electrode plate represented by CW is 5 $mg/cm^2$~12 $mg/cm^2$. Preferably, the coating weight per unit area on one of the surfaces of the negative electrode plate represented by CW is 6.8 $mg/cm^2$~9.2 $mg/cm^2$.

The average particle diameter of the negative active material represented by D50 is 5 μm~14 μm. Preferably, the average particle diameter of the negative active material represented by D50 is 7.2 μm~13.1 μm.

A BET of the negative active material is 1.1 $m^2/g$~2.9 $m^2/g$.

A porosity of the negative electrode plate represented by $P_n$ is 25%~40%. Preferably, the porosity of the negative electrode plate represented by $P_n$ is 30%~40%.

A pressing density of the negative electrode plate represented by PD is 1.4 $g/cm^3$~1.7 $g/cm^3$.

The negative active material further comprises one or more selected from a group consisting of soft carbon, hard carbon, carbon fiber, mesocarbon microbeads, silicon-based material, tin-based material and lithium titanate.

The positive electrode plate comprises a positive current collector and a positive film, the positive film is provided on at least one surface of the positive current collector and comprises a positive active material, the positive active material comprises one or more selected from a group consisting of lithium nickel cobalt manganese oxide and lithium nickel cobalt aluminum oxide. Further preferably, the positive active material comprises one or more selected from a group consisting of $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$ and $LiNi_{0.85}Co_{0.15}Al_{0.05}O_2$.

The present disclosure further provides a testing method of an active specific surface area of an electrode plate, which comprises steps of: (1) an electrode plate to be tested, a metal sheet and an electrolyte are assembled into a button half battery, the electrolyte contains an electrochemical redox probe with a concentration of c, a redox potential of the probe is 1 V~4 V, and the probe is dissolved into the electrolyte; (2) a series of cyclic voltammetry curves under a series of scanning rates v of the button half battery are obtained on an electrochemical workstation, then a series of peak currents $i_p$ are obtained from the cyclic voltammetry curves, then the obtained peak currents $i_p$ of the button half battery as Y-coordinates and a square root of each scanning rate v (that is $\sqrt{v}$) as X-coordinates are used to draw a graph so as to obtain a slope K; in a Randles-Sevick equation $i_p = 2.69 \times 10^5 n^{3/2} Ac\sqrt{D}\sqrt{v}$, $i_p$ represents a peak current, n represents an electron transfer number of the electrode reaction, A represents an active surface area of the electrode plate, c represents a concentration of the probe, D represents a diffusion coefficient of the probe, v represents a scanning rate, and the slope is obtained according to an equation $K = 2.69 \times 10^5 n^{3/2} Ac\sqrt{D}$, the active surface area of the electrode plate is obtained according to an equation $A=K/(2.69 \times 10^5 n^{3/2} c\sqrt{D})$, and the active specific surface area of the electrode plate is a ratio of the active surface area of the electrode plate represented by A to a weight of the electrode plate represented by m.

Compared with the existing technologies, the present disclosure at least includes the following beneficial effects: in the present disclosure, by reasonably controlling the active specific surface area of the negative electrode plate, the battery can have the characteristics of high energy density and excellent dynamics performance at the same time.

DETAILED DESCRIPTION

Hereinafter a negative electrode plate, a testing method of an active specific surface area of an electrode plate, a battery according to the present disclosure are described in detail.

Firstly, a negative electrode plate according to a first aspect of the present disclosure is described. The negative electrode plate comprises a negative current collector and a negative film, the negative film is provided on at least one surface of the negative current collector and comprises a negative active material, the negative active material comprises graphite, and an active specific surface area of the negative electrode plate is 1 $cm^2/g$~15 $cm^2/g$.

The negative electrode plate needs to undergo the following three electrochemical processes during the charging process of the battery: (1) the active ions (such as lithium ions, sodium-ions and the like) deintercalate from the positive active material and enter into the electrolyte, pass through the separator, and then enter into the porous structure of the negative film along with the electrolyte, so that a liquid phase conduction process of the active ions in the porous structure of the negative film is completed; (2) the active ions exchange charges with the electrons on the surface of the negative active material; (3) the active ions enter into the crystal structure of the negative active material from the surface of the negative active material through a solid phase conduction process.

It should be noted that, "the active specific surface area of the negative electrode plate" in the present disclosure is different from "the specific surface area of the negative electrode plate" in existing technologies. At present, the specific surface area of the negative electrode plate is mostly obtained by gas adsorption using the BET method in the industry, which can only represent the physical adsorption specific surface area of the negative electrode plate, and cannot accurately reflect the active specific surface area of the negative electrode plate during actual reactions. The active specific surface area of the negative electrode plate, which is the active specific surface area of the negative electrode plate during actual reactions, can accurately reflect the amount of the active sites in the negative electrode plate during the charging and discharging process. The larger the active specific surface area of the negative electrode plate is, the more the amount of the active sites in the negative electrode plate is, the faster the charge exchange speed between the active ions and the electrons is, the better the dynamics performance of the negative electrode plate is, and the better the dynamics performance of the battery is. However, when the active specific surface area of the negative electrode plate is more than 15 $cm^2/g$, the electrochemical activity of the negative electrode plate is too high, the side reactions between the negative electrode plate and the electrolyte are too more, the SEI membrane formed on the surface of the negative electrode plate is too thick, the resistance with respect the active ions to pass through the SEI membrane on the surface of the negative electrode plate and enter into the negative electrode plate is too large, therefore the dynamics performance of the negative electrode plate decreases; when the active specific surface area of the negative electrode plate is less than 1 $cm^2/g$, the amount of the active sites in the negative electrode plate is less, the charge exchange speed between the active ions and the electrons is slower, therefore the dynamics performance of the negative electrode plate is worse.

Preferably, the active specific surface area of the negative electrode plate is 2 $cm^2/g$~13 $cm^2/g$. Further preferably, the active specific surface area of the negative electrode plate is 5 $cm^2/g$~10 $cm^2/g$.

The physical adsorption specific surface area of the negative active material (that is BET) affects the active specific surface area of the negative electrode plate to a certain extent. Generally, the active specific surface area of the negative electrode plate increases as the physical adsorption specific surface area of the negative active material increases. Moreover, the larger the physical adsorption specific surface area of the negative active material is, the higher the electrochemical activity of the negative active material is, the faster the charge exchange speed between the active ions and the electrons on the surface of the negative active material is, however, the side reactions between the negative active material and the electrolyte also increase.

Preferably, a BET of the negative active material is 1.0 $m^2/g$~3.5 $m^2/g$. Further preferably, the BET of the negative active material is 1.1 $m^2/g$~2.9 $m^2/g$.

An average particle diameter of the negative active material represented by D50 also affects the active specific surface area of the negative electrode plate to a certain extent. Generally, the active specific surface area of the negative electrode plate increases as the average particle diameter of the negative active material represented by D50 decreases, and the smaller the average particle diameter of the negative active material is, the more sufficiently the negative active material contacts the electrolyte, the more beneficial it is for the charge exchange process between the active ions and the electrons, and the further more beneficial it is for the battery to be charged under a fast speed; however, the smaller the average particle diameter of the negative active material is, the more difficult the preparation of the negative slurry is, and the consistency of the negative electrode plate may be affected.

Preferably, the average particle diameter of the negative active material represented by D50 is 4 μm~20 μm. Further preferably, the average particle diameter of the negative active material represented by D50 is 5 μm~14 μm.

A porosity of the negative electrode plate represented by $P_n$ and a pressing density of the negative electrode plate represented by PD also effect the active specific surface area of the negative electrode plate to a certain extent. Generally, when the pressing density of the negative electrode plate is larger, the porous structure of the negative electrode plate is more seriously pressed, the negative electrode plate is more dense, and the porosity of the negative electrode plate is smaller, the negative active material particles more tightly contact with each other, the amount of the active sites exposed in the electrolyte is less, the amount of the active sites capable of reacting in the porous negative electrode plate is less, and the active specific surface area of the negative electrode plate is smaller.

Preferably, the porosity of the negative electrode plate represented by $P_n$ is 20%~60%. Further preferably, the porosity of the negative electrode plate represented by $P_n$ is 25%~50%. The porosity of the negative electrode plate represented by $P_n$ can be obtained by a gas filling method, for example, a actual volume of the negative electrode plate represented by $V_2$ can be contained by filling helium into the pores of the negative electrode plate, and then an apparent volume of the negative electrode plate represented by $V_1$ can be obtained according to the coating weight of the negative electrode plate and the pressing density of the negative electrode plate, and the porosity of the negative electrode plate is obtained according to an equation $P_n=(V_1-V_2)/V_1\times 100\%$.

Preferably, the pressing density of the negative electrode plate represented by PD is 0.8 g/cm$^3$~2.0 g/cm$^3$. Further preferably, the pressing density of the negative electrode plate represented by PD is 1.0 g/cm$^3$~1.8 g/cm$^3$.

The dynamics performance of the negative active material is one of the key factors that affect the dynamics performance of the battery. Generally, the smaller the average particle diameter of the negative active material represented by D50 is, the better the dynamics performance of the battery is. And after the negative active material is selected, the design of the negative electrode plate also has an important effect on the dynamics performance of the battery. Generally, the smaller the coating weight of the negative electrode plate is, the better the dynamics performance of the battery is, however, the lower the energy density of the battery is. The inventors further found that, when the negative electrode plate further satisfies a relationship $0.4 \leq CW/D50 \leq 2.8$, the battery can have the characteristics of high energy density and excellent dynamics performance at the same time. CW represents a coating weight per unit area on one of the surfaces of the negative electrode plate with a unit of mg/cm$^2$; D50 represents an average particle diameter of the negative active material with a unit of μm.

Preferably, $0.6 \leq CW/D50 \leq 1.3$.

Preferably, the coating weight per unit area on one of the surfaces of the negative electrode plate represented by CW is 2 mg/cm$^2$~13 mg/cm$^2$. Further preferably, the coating weight per unit area on one of the surfaces of the negative electrode plate represented by CW is 5 mg/cm$^2$~12 mg/cm$^2$. More further preferably, the coating weight per unit area on one of the surfaces of the negative electrode plate represented by CW is 3 mg/cm$^2$~8 mg/cm$^2$.

In the negative electrode plate, the graphite may be one or more selected from a group consisting of artificial graphite and natural graphite. The negative active material may further comprise one or more selected from a group consisting of soft carbon, hard carbon, carbon fiber, mesocarbon microbeads, silicon-based material, tin-based material and lithium titanate besides the graphite. The silicon-based material may be one or more selected from a group consisting of elemental silicon, silicon oxide, silicon carbon composite and silicon alloy; the tin-based material may be one or more selected from a group consisting of elemental tin, tin oxide compound and tin alloy.

In the negative electrode plate, the negative film further comprises a conductive agent and a binder, the types and the contents of the conductive agent and the binder are not specifically limited and may be selected based on actual demands. The type of the negative current collector is not specifically limited and may be selected based on actual demands, and preferably, the negative current collector is a copper foil.

Next a testing method of an active specific surface area of an electrode plate according to a second aspect of the present disclosure is described. The testing method comprises steps of: (1) an electrode plate to be tested, a metal sheet and an electrolyte are assembled into a button half battery, the electrolyte contains an electrochemical redox probe with a concentration of c, a redox potential of the probe is 1 V~4 V, and the probe is dissolved into the electrolyte; (2) a series of cyclic voltammetry curves under a series of scanning rates v of the button half battery are obtained on an electrochemical workstation, then a series of peak currents $i_p$ are obtained from the cyclic voltammetry curves, then the obtained peak currents $i_p$ of the button half battery as Y-coordinates and a square root of each scanning rate v (that is $\sqrt{v}$) as X-coordinates are used to draw a graph so as to obtain a slope K. In a Randles-Sevick equation $i_p=2.69\times 10^5 n^{3/2} Ac\sqrt{D}\sqrt{v}$, $i_p$ represents a peak current, n represents an electron transfer number of the electrode reaction, A represents an active surface area of the electrode plate, c represents a concentration of the probe, D represents a diffusion coefficient of the probe, v represents a scanning rate, and the slope is obtained according to an equation $K=2.69\times 10^5 n^{3/2} Ac\sqrt{D}$, the active surface area of the electrode plate is obtained according to an equation $A=K/(2.69\times 10^5 n^{3/2} c\sqrt{D})$, and the active specific surface area of the electrode plate is a ratio of the active surface area of the electrode plate represented by A to a weight of the electrode plate represented by m.

When a certain potential is applied on the button half battery, the electrons pass through the current collector and then transfer to the active sites on the surface of the active material of the electrode plate, the redox reactions of the probe in the electrolyte occur at the active sites, and the respective response current can reflect the value of the active surface area of the electrode plate during actual reactions.

The testing method of the active specific surface area of the electrode plate in the present disclosure can be used in both the testing of the active specific surface area of the positive electrode plate in the battery and the testing of the active specific surface area of the negative electrode plate in the battery.

Preferably, in step (1), the metal sheet is a lithium metal sheet or a sodium metal sheet.

Preferably, in step (1), the electrolyte is the electrolyte conventionally used in the battery and the electrolyte comprises an electrolyte salt and an organic solvent. The electrolyte salt may be a lithium salt or a sodium salt; the organic solvent comprises one or more selected from a group consisting of cyclic carbonate, chain carbonate and carboxylic ester.

Preferably, in step (1), the redox potential of the probe is 3 V~4 V.

Preferably, in step (1), the concentration the of the probe c is 30 mmol/L~70 mmol/L.

Preferably, in step (1), the probe is one selected from hexaammineruthenium (III) chloride, ferric chloride and ferrocene. And when the electrolyte comprising the lithium ions is used, preferably, the probe is ferrocene, this is because the redox potential of ferrocene makes it very suitable to work in a potential window of the electrolyte comprising the lithium ions, and the testing result is more accurate. And moreover, ferrocene has a good compatibility with the electrolyte.

Preferably, in step (2), the scanning rate v is 0.05 mV/s~3 mV/s, a scanning voltage range is 2.8 V~3.6 V.

D represents the diffusion coefficient of the probe, and the value thereof is related to the specific type of the probe, for example, the diffusion coefficient of ferrocene is $2.1\times 10^{-6}$ cm$^2$/s.

Next a battery according to a third aspect of the present disclosure is described. The battery comprises a positive electrode plate, a negative electrode plate, a separator and an electrolyte, and the negative electrode plate is the negative electrode plate according to the first aspect of the present disclosure.

In the battery according to the third aspect of the present disclosure, the positive electrode plate comprises a positive current collector and a positive film, the positive film is provided on at least one surface of the positive current collector and comprises a positive active material, a conductive agent and a binder. The specific type and the specific composition of the positive electrode plate are not specifically limited and may be selected based on actual demands.

It should be noted that, the battery according to the third aspect of the present disclosure may be a lithium-ion battery, a sodium-ion battery and any other battery using the negative electrode plate according to the first aspect of the present disclosure.

When the battery is the lithium-ion battery, the positive active material may be selected from lithium cobalt oxide, lithium nickel oxide, lithium manganese oxide, lithium nickel manganese oxide, lithium nickel cobalt manganese oxide, lithium nickel cobalt aluminum oxide and olivine-type lithium-containing phosphate, but the present disclosure is not limited thereto, other conventionally known materials that can be used as the positive active material of the lithium-ion battery can also be used. These positive active materials may be used alone or may be used as two or more of them in combination. Preferably, the positive active material may be one or more selected from a group consisting of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ and $LiMnPO_4$.

When the battery is a sodium-ion battery, the positive active material may be selected from transition metal oxide $Na_xMO_2$ (M represents transition metal, preferably, M is one or more selected from a group consisting of Mn, Fe, Ni, Co, V, Cu and Cr, $0<x\leq1$), polyanion-type material (phosphate-type, fluorophosphate-type, pyrophosphate-type and sulfate-type) and prussian blue material, but the present disclosure is not limited thereto, other conventionally known materials that can be used as the positive active material of the sodium-ion battery can also be used. These positive active materials may be used alone or may be used as two or more of them in combination. Preferably, the positive active material may be one or more selected from a group consisting of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, prussian blue material and a material with a general formula of $A_aM_b(PO_4)_cO_xY_{3-x}$ (A is one or more selected from a group consisting of $H^+$, $Li^+$, $Na^+$, $K^+$ and $NH_4^+$; M represents transition metal cation, preferably, M is one or more selected from a group consisting of V, Ti, Mn, Fe, Co, Ni, Cu and Zn; Y represents anion of halogen, preferably, Y is one or more selected from a group consisting of F, Cl and Br; $0<a\leq4$, $0<b\leq2$, $1\leq c\leq3$, $0\leq x\leq2$).

In the battery according to the third aspect of the present disclosure, the type of the separator is not specifically limited, the separator may be any separator used in existing batteries, for example, the separator may be a polyethylene membrane, a polypropylene membrane, a polyvinylidene fluoride membrane and a multilayer composite membrane thereof, but the present disclosure is not limited thereto.

In the battery according to the third aspect of the present disclosure, the specific type and the specific composition of the electrolyte are not specifically limited and may be selected based on actual demands.

Hereinafter the present disclosure will be described in detail taking a lithium-ion battery as an example in combination with specific examples. It should be noted that, the examples described in the present disclosure are only used for explaining the present disclosure, and are not intended to limit the scope of the present disclosure.

Batteries of examples 1-22 and comparative examples 1-4 were all prepared in accordance with the following preparation method.

(1) Preparation of a Positive Electrode Plate

NCM523 (positive active material), acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on both surfaces of aluminum foil (positive current collector), drying was then performed under room temperature and continual drying was performed in an oven, which was then followed by cold pressing and plate cutting, finally the positive electrode plate was obtained.

(2) Preparation of a Negative Electrode Plate

The negative active material shown in table 1, Super-P (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on both surfaces of copper foil (negative current collector), drying was then performed under room temperature and continual drying was performed in an oven, which was then followed by cold pressing and plate cutting, finally the negative electrode plate was obtained.

(3) Preparation of an Electrolyte

Ethylene carbonate (EC) and ethyl methyl carbonate (EMC) according to a volume ratio of 3:7 were mixed together to obtain an organic solvent, then sufficiently dried $LiPF_6$ was dissolved into the mixed organic solvent to obtain an electrolyte, and a concentration of the electrolyte was 1 mol/L.

(4) Preparation of a Separator

The separator was a polyethylene membrane.

(5) Preparation of a Lithium-Ion Battery

The positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly, then the electrode assembly was put into a case, which was followed by baking, electrolyte injection, vacuum packaging, standby, formation, shaping and the like, finally a lithium-ion battery was obtained.

Hereinafter testing processes of the lithium-ion batteries were described.

(1) Testing of the Active Specific Surface Area of the Negative Electrode Plate

The negative electrode plate prepared in the examples and the comparative examples was used as a cathode, a lithium metal sheet was used as an anode, ferrocene with a concentration of 50 mmol/L was added into the electrolyte (which was the same as the electrolyte in the preparation method of the battery), then the cathode, the anode and the electrolyte were assembled into a button half battery. Four half button batteries used as parallel samples were scanned respectively at scanning rates v of 0.1 mV/s, 0.3 mV/s, 0.5 mV/s and 1 mV/s to obtain a series of cyclic voltammetry curves under the different scanning rates, then a peak current $i_p$ of each cyclic voltammetry curve was extracted using a EC-Lab software. A linear graph of $i_p$ and $\sqrt{v}$ was obtained where the square root of the scanning rate v ($\sqrt{v}$) was used as X-coordinate and the peak current $i_p$ was used as Y-coordinate, and then the slope K of the linear graph was obtained.

In a Randles-Sevick equation $i_p=2.69\times10^5 n^{3/2} Ac\sqrt{D}\sqrt{v}$, then the slope was obtained according to an equation $K=2.69\times10^5 n^{3/2} Ac\sqrt{D}$. n represented an electron transfer number of the electrode reaction and the value thereof was related to the type of the probe, and here the value was 1; c represented a concentration of ferrocene with a value of 50 mmol/L; D represented a diffusion coefficient of the probe with a value of $2.1\times10^{-6}$ cm$^2$/s. And the active surface area of the negative electrode plate was obtained according to an equation $A=K/(2.69\times10^5 n^{3/2} c\sqrt{D})$, and the active specific surface area of the negative electrode plate was a ratio of the active surface area of the negative electrode plate represented by A to a weight of the negative electrode plate represented by m.

(2) Testing of the Measured Energy Density of the Battery

At 25° C., the lithium-ion batteries prepared in the examples and the comparative examples were fully charged at a constant current of 1 C and fully discharged at a constant current of 1 C, the measured discharge capacity at this time was recorded; at 25° C., the lithium-ion batteries were weighed by an electronic balance. And the measured energy density of the lithium-ion battery was a ratio of the measured discharge capacity of lithium-ion battery discharged at 1 C to the weight of the lithium-ion battery.

When the measured energy density was less than 80% of the targeted energy density, the measured energy density of the battery was considered to be very low; when the measured energy density was more than or equal to 80% of the targeted energy density and less than 95% of the targeted energy density, the measured energy density of the battery was considered to be lower; when the measured energy density was more than or equal to 95% of the targeted energy density and less than 105% of the targeted energy density, the measured energy density of the battery was considered to be moderate; when the measured energy density was more than or equal to 105% of the targeted energy density and less than 120% of the targeted energy density, the measured energy density of the battery was considered to be higher; when the measured energy density was more than or equal to 120% of the targeted energy density, the measured energy density of the battery was considered to be very high.

(3) Testing of the Dynamics Performance of the Battery

At 25° C., the lithium-ion batteries prepared in the examples and the comparative examples were fully charged at a constant current of x C and fully discharged at a constant current of 1 C for 10 cycles, then the lithium-ion batteries were fully charged at a constant current of x C, then the negative electrode plates were disassembled from the lithium-ion batteries, and the lithium precipitation on the surface of each negative electrode plate was observed.

TABLE 1

Parameters and testing results of examples 1-22 and comparative examples 1-4

| | Negative active material | D50 (μm) | Porosity $P_n$ | Pressing density PD (g/cm$^3$) | Coating weight per unit area on one of the surfaces CW (mg/cm$^2$) | Active specific surface area (cm$^2$/g) | CW/D50 | Lithium-precipitation window of battery | Energy density of battery |
|---|---|---|---|---|---|---|---|---|---|
| Example 1 | graphite | 6.1 | 20% | 2.0 | 7.3 | 1.0 | 1.2 | 1.9 C | very high |
| Example 2 | graphite | 6.1 | 30% | 1.8 | 7.3 | 5.4 | 1.2 | 3.5 C | very high |
| Example 3 | graphite | 6.1 | 35% | 1.7 | 7.3 | 6.7 | 1.2 | 3.6 C | very high |
| Example 4 | graphite | 6.1 | 40% | 1.4 | 7.3 | 7.1 | 1.2 | 4.3 C | very high |
| Example 5 | graphite | 6.1 | 55% | 1.1 | 7.3 | 9.8 | 1.2 | 6.2 C | higher |
| Example 6 | graphite | 6.1 | 45% | 0.9 | 7.3 | 12.5 | 1.2 | 2.7 C | moderate |
| Example 7 | graphite | 6.1 | 50% | 0.8 | 7.3 | 15.0 | 1.2 | 2.5 C | moderate |
| Example 8 | graphite | 5.3 | 65% | 1.0 | 7.3 | 8.1 | 1.4 | 3.2 C | higher |
| Example 9 | graphite | 9.4 | 45% | 0.7 | 7.3 | 11.2 | 0.8 | 2.8 C | moderate |
| Example 10 | graphite | 20.0 | 35% | 1.2 | 5.1 | 8.3 | 0.3 | 2.6 C | lower |
| Example 11 | graphite | 18.0 | 40% | 1.3 | 7.2 | 8.5 | 0.4 | 3.0 C | higher |
| Example 12 | graphite | 18.5 | 30% | 1.2 | 9.2 | 8.4 | 0.5 | 3.4 C | higher |
| Example 13 | graphite | 11.3 | 38% | 1.4 | 6.8 | 8.2 | 0.6 | 4.1 C | higher |
| Example 14 | graphite | 13.1 | 28% | 1.2 | 10.5 | 8.1 | 0.8 | 5.2 C | higher |
| Example 15 | graphite | 7.2 | 35% | 1.3 | 8.1 | 8.7 | 1.1 | 5.6 C | higher |
| Example 16 | graphite | 6.7 | 37% | 1.2 | 8.7 | 8.4 | 1.3 | 5.5 C | higher |
| Example 17 | graphite | 5.1 | 30% | 1.3 | 10.5 | 8.6 | 2.1 | 3.3 C | higher |
| Example 18 | graphite | 4.4 | 33% | 1.4 | 12.2 | 8.6 | 2.8 | 3.2 C | very high |
| Example 19 | graphite | 4.2 | 28% | 1.4 | 12.9 | 8.5 | 3.1 | 2.8 C | very high |
| Example 20 | graphite + soft carbon (7:3) | 5.4 | 35% | 1.7 | 6.6 | 6.6 | 1.2 | 4.1 C | lower |
| Example 21 | graphite + hard carbon (7:3) | 5.6 | 35% | 1.7 | 6.9 | 6.7 | 1.2 | 4.4 C | lower |
| Example 22 | graphite + silicon (7:3) | 5.2 | 35% | 1.7 | 6.4 | 6.8 | 1.2 | 3.9 C | very high |
| Comparative example 1 | graphite | 7.1 | 15% | 2.1 | 9.8 | 0.5 | 1.4 | 0.7 C | very high |
| Comparative example 2 | graphite | 4.1 | 15% | 2.1 | 12.1 | 0.5 | 3.0 | 0.5 C | very high |
| Comparative example 3 | graphite | 8.2 | 50% | 0.7 | 12.8 | 17 | 1.6 | 0.6 C | lower |
| Comparative example 4 | graphite | 5.2 | 50% | 0.7 | 15.2 | 17 | 2.9 | 0.3 C | lower |

If the lithium precipitation was not observed on the surface of the negative electrode plate (that was the lithium-precipitation area was less than or equal to 5%), the testing process was repeated with a charge rate x C increased in increments of 0.1 C, until the lithium-precipitation area on the surface of the negative electrode plate was more than 5%, the testing process was stopped, the charge rate at this time was the lithium-precipitation window of the battery.

In examples 1-7, by reasonably adjusting the pressing density of the negative electrode plate and the porosity of the negative electrode plate so as to make the active specific surface area of the negative electrode plate be between 1 cm$^2$/g and 15 cm$^2$/g, the electrochemical activity of the negative electrode plate was higher, the lithium ions and the electrons might perform fast charge exchange on the surface of the negative active material, therefore the negative electrode plate had excellent dynamics performance, the lithium-precipitation window of the battery was higher, and the battery could have the characteristics of high energy density and excellent dynamics performance at the same time.

The preferred range of the porosity of the negative electrode plate represented by $P_n$ was 20%~60%, the preferred range of the pressing density of the negative electrode plate represented by PD was 0.8 g/cm$^3$~2.0 g/cm$^3$. But the present disclosure was not limited thereto, referring to example 8 and example 9, the porosity of the negative electrode plate or the pressing density of the negative electrode plate did not fall within the above preferred ranges, but by reasonably adjusting the morphology of the porous structure of the negative electrode plate and making the active specific surface area of the negative electrode plate between 1 cm$^2$/g and 15 cm$^2$/g, the battery could still have the characteristics of high energy density and excellent dynamics performance at the same time.

The active specific surface area of the negative electrode plate of comparative example 1 and the active specific surface area of the negative electrode plate of comparative example 2 were too small, the active sites in the negative electrode plate were too less, the charge exchange speed between the lithium ions and the electrons on the surface of the negative active material was too low, the lithium-precipitation window of the battery was very low, therefore the dynamics performance of the negative electrode plate and the dynamics performance of the battery were both very bad. The active specific surface area of the negative electrode plate of comparative example 3 and the active specific surface area of the negative electrode plate of comparative example 4 were too large, the electrochemical activity of the negative electrode plate was too high, the side reactions between the negative electrode plate and the electrolyte increased, the side products precipitated on the surface of the negative electrode plate increased, and the resistance was also increased with respect to the lithium ions to pass through the SEI membrane on the surface of the negative electrode plate and enter into the negative film, the lithium-precipitation window of the battery decreased, the dynamics performance of the negative electrode plate and the dynamics performance of the battery were both very bad; and moreover, the side reactions between the negative electrode plate and the electrolyte were too more, a large number of lithium ions were consumed, therefore the irreversible loss of the capacity increased and the energy density of the battery was also affected.

The coating weight of the negative electrode plate represented by CW and the average particle diameter of the negative active material represented by D50 would also affect the energy density and the dynamics performance of the battery. When the value of CW/D50 was between 0.4 and 2.8, the comprehensive performances of the battery were better. When the lower limit value of CW/D50 was less than 0.4, the coating weight of the negative electrode plate was easily smaller or the average particle diameter of the negative active material represented by D50 was easily larger, wherein when the coating weight of the negative film was smaller, the weight energy density of the battery was lower, when the average particle diameter of the negative active material represented by D50 was larger, the dynamics performance of the negative electrode plate was worse, therefore the dynamics performance of the battery was also worse. When the upper limit value of CW/D50 was more than 2.8, the coating weight of the negative electrode plate was easily larger or the average particle diameter of the negative active material represented by D50 was easily smaller, wherein when the coating weight of the negative electrode plate was larger, the thickness of the negative film was larger, the liquid phase polarization on the concentration of the lithium ions in the negative film between a side close to the separator and a side close to the negative current collector increased during the charging and discharging process of the battery, the charge exchange speed between the lithium ions and the electrons became slower, and the dynamics performance of the battery was worse. Therefore, the comprehensive performances of the batteries prepared in example 10 and example 19 were worse than the comprehensive performances of the batteries prepared in examples 11-18.

What is claimed:

1. A battery comprising a positive electrode plate, a negative electrode plate, a separator and an electrolyte, the negative electrode plate comprising a negative current collector and a negative film, the negative film being provided on at least one surface of the negative current collector and comprising a negative active material;

wherein the negative active material comprises graphite, and an active specific surface area of the negative electrode plate is 1 cm$^2$/g~15 cm$^2$/g;

the negative electrode plate further satisfies a relationship: $0.6 \leq CW/D50 \leq 1.3$, CW represents a coating weight per unit area on one of the surfaces of the negative electrode plate with a unit of mg/cm$^2$, D50 represents an average particle diameter of the negative active material with a unit of μm;

the coating weight per unit area on one of the surfaces of the negative electrode plate represented by CW is 5 mg/cm$^2$~12 mg/cm$^2$;

a pressing density of the negative electrode plate represented by PD is 1.7 g/cm$^3$~2.0 g/cm$^3$;

the active specific surface area of the negative electrode plate is obtained by:

assembling an electrode plate, a metal sheet and an electrolyte into a button half battery, wherein the electrolyte contains an electrochemical redox probe with a concentration of c, a redox potential of the probe is 1 V~4 V, and the probe is dissolved into the electrolyte;

obtaining a series of cyclic voltammetry curves under a series of scanning rates v of the button half battery on an electrochemical workstation, and then obtaining a series of peak currents $i_p$ from the cyclic voltammetry curves, and then drawing a graph for the obtained peak currents $i_p$ of the button half battery as Y-coordinates and a square root of each scanning rate v (that is $\sqrt{v}$) as X-coordinates so as to obtain a slope K of the graph;

in a Randles-Sevick equation $i_p = 2.69 \times 10^5 n^{3/2} Ac\sqrt{D}\sqrt{v}$, $i_p$ represents a peak current, n represents an electron transfer number of the electrode reaction, A represents an active surface area of the electrode plate, c represents a concentration of the probe, D represents a diffusion coefficient of the probe, v represents a scanning rate, and obtaining the slope K of the graph according to an equation $K = 2.69 \times 10^5 n^{3/2} Ac\sqrt{D}$ and the active surface area of the electrode plate according to an equation $A = K/(2.69 \times 10^5 n^{3/2} c\sqrt{D})$, and determining the active specific surface area of the electrode plate as a ratio of the active surface area of the electrode plate represented by A to a weight of the electrode plate represented by m.

2. The battery according to claim 1, wherein the active specific surface area of the negative electrode plate is 5.4 cm²/g~15 cm²/g.

3. The battery according to claim 2, wherein the active specific surface area of the negative electrode plate is 9.8 cm²/g~12.5 cm²/g.

4. The battery according to claim 1, wherein the negative electrode plate further satisfies a relationship: $0.6 \leq CW/D50 \leq 0.8$.

5. The battery according to claim 1, wherein the coating weight per unit area on one of the surfaces of the negative electrode plate represented by CW is 6.8 mg/cm²~9.2 mg/cm².

6. The battery according to claim 1, wherein the average particle diameter of the negative active material represented by D50 is 5 μm~14 μm.

7. The battery according to claim 6, wherein the average particle diameter of the negative active material represented by D50 is 7.2 μm~13.1 μm.

8. The battery according to claim 1, wherein a BET of the negative active material is 1.1 m²/g~2.9 m²/g.

9. The battery according to claim 1, wherein a porosity of the negative electrode plate represented by $P_a$ is 25%~40%.

10. The battery according to claim 9, wherein the porosity of the negative electrode plate represented by $P_a$ is 30%~40%.

11. The battery according to claim 1, wherein the negative active material further comprises one or more selected from a group consisting of soft carbon, hard carbon, carbon fiber, mesocarbon microbeads, silicon-based material, tin-based material and lithium titanate.

12. The battery according to claim 1, wherein the positive electrode plate comprises a positive current collector and a positive film, the positive film is provided on at least one surface of the positive current collector and comprises a positive active material, the positive active material comprises one or more selected from a group consisting of lithium nickel cobalt manganese oxide and lithium nickel cobalt aluminum oxide.

13. The battery according to claim 12, wherein the positive active material comprises one or more selected from a group consisting of $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$ and $LiNi_{0.85}Co_{0.15}Al_{0.05}O_2$.

* * * * *